United States Patent [19]
Johnson

[11] Patent Number: 6,158,783
[45] Date of Patent: Dec. 12, 2000

[54] WELDABLE PLUG-IN COUPLING FOR A PRESSURE VESSEL

[75] Inventor: Truman G. Johnson, Urbana, Ohio

[73] Assignee: Johnson Welded Products, Inc., Urbana, Ohio

[21] Appl. No.: 09/351,441

[22] Filed: Jul. 12, 1999

[51] Int. Cl.[7] .............................. F16L 5/00; F16L 41/00; F16L 47/00
[52] U.S. Cl. .................. 285/205; 285/288.4; 285/139.1; 285/322; 285/351
[58] Field of Search .............................. 285/139.1, 139.2, 285/139.3, 140.1, 205, 288.1, 288.4, 288.5, 288.7, 289.1, 289.2, 289.3, 289.4, 289.5, 321, 322, 351

[56] References Cited

U.S. PATENT DOCUMENTS

| | | | |
|---|---|---|---|
| 2,306,180 | 12/1942 | Myers et al. ...................... | 285/288.4 |
| 3,826,523 | 7/1974 | Eschbaugh . | |
| 4,226,445 | 10/1980 | Kramer . | |
| 5,386,923 | 2/1995 | Nakashima et al. ................ | 285/288.4 |
| 5,524,938 | 6/1996 | Halder .................... | 285/289.2 |
| 5,681,060 | 10/1997 | Berg et al. . | |
| 5,988,703 | 11/1999 | Craig .................... | 285/288.1 |

Primary Examiner—Neill Wilson
Attorney, Agent, or Firm—Mark A. Navarre

[57] ABSTRACT

An improved and cost-effective plug-in coupling for leak-proof attachment of a pressure pipe to a pressure vessel, including a weldable ferrule secured in an opening in the pressure vessel, a plug-in fitting attached to the pressure pipe and having a plug portion inserted into a central bore of the ferrule, a pair of O-rings sealingly engaging the plug portion of the fitting and the central bore of the ferrule, and a snap ring for retaining the plug portion of the fitting in the central bore of the ferrule. The ferrule includes a broad cylindrical head that contacts the outer periphery of the pressure vessel, the ferrule being welded to the pressure vessel at the outer radial periphery of such head to form a leak-proof and durable seal between the ferrule and the pressure vessel. The broad ferrule head absorbs and dissipates the heat from the welding operation, minimizing any heat-related distortion of the central bore. In one embodiment, the central bore of the ferrule includes an outboard portion having a first diameter sized to sealingly receive the plug portion and O-rings, and an inboard portion having a larger diameter, with the snap ring seating on a shoulder defined by the junction between the inboard and outboard portions. In another embodiment, the central bore has constant inside diameter, and the snap ring seats against an inboard axial face of the ferrule.

3 Claims, 1 Drawing Sheet

WELDABLE PLUG-IN COUPLING FOR A PRESSURE VESSEL

TECHNICAL FIELD

The present invention relates to pressurized systems in which a fluid or gas under pressure is confined in a pressure vessel, and more particularly to a leak-proof plug-in coupling welded to the pressure vessel.

BACKGROUND OF THE INVENTION

Pressure vessel systems are in widespread usage in a variety of applications, including heavy duty truck brake systems. In general, fluid or gas is maintained under pressure in a welded vessel, and a pressure pipe coupled to the vessel distributes the pressurized fluid or gas to an end use device, such as a brake cylinder. The pipe may be coupled to the pressure vessel in various ways, including threaded fittings, and sealed plug-in fittings. While threaded fittings are easily removed for system maintenance and repair, they also tend to leak, resulting in system down-time for repairs. Plug-in fittings, on the other hand, use one or more O-rings to seal against a smooth bore of a receiver or ferrule that is attached to the pressure vessel, and are typically retained in place with a snap ring which radially expands into a ring groove formed in the bore of the ferrule. Compared to threaded fittings, plug-in fittings provide a significantly more reliable coupling, in addition to being capable of quick installation. Unfortunately, however, plug-in fittings tend to be relatively expensive due to the required machining of the ferrule, and are not generally amenable to welding due to heat-related distortion of the ferrule bore which forms the sealing surface for the O-rings. Accordingly, what is needed is a plug-in fitting that provides the reliable sealing advantages of known plug-in fittings, but which is inexpensive to manufacture and amenable to welding.

SUMMARY OF THE INVENTION

The present invention is directed to an improved and cost-effective plug-in coupling for leak-proof attachment of a pressure pipe to a pressure vessel, including a ferrule welded in an opening in the pressure vessel, a plug-in fitting attached to the pressure pipe and having a plug portion inserted into a central bore of the ferrule, a pair of O-rings sealingly engaging the plug portion of the fitting and the central bore of the ferrule, and a snap ring for retaining the fitting in the ferrule. According to the invention, the ferrule includes a broad cylindrical head that contacts the outer periphery of the pressure vessel, and the ferrule is welded to the pressure vessel at the outer radial periphery of such head to form a leak-proof and durable seal between the ferrule and the pressure vessel. The broad ferrule head absorbs and dissipates the heat from the welding operation, minimizing any heat-related distortion of the central bore. According to a first embodiment, the central bore of the ferrule has a dual inside diameter defined by an outboard portion having a first diameter sized to sealingly receive the plug portion and O-rings, and an inboard portion having a larger diameter, with the snap ring seating on a shoulder between the inboard and outboard portions. According to a second embodiment, the central bore of the ferrule has a single inside diameter sized to sealingly receive the plug portion and O-rings, and the snap ring seats on an inboard axial face of the central bore. Both embodiments provide a reliable, leak-proof coupling at a low cost.

DESCRIPTION OF THE PREFERRED EMBODIMENT

Figure 1:
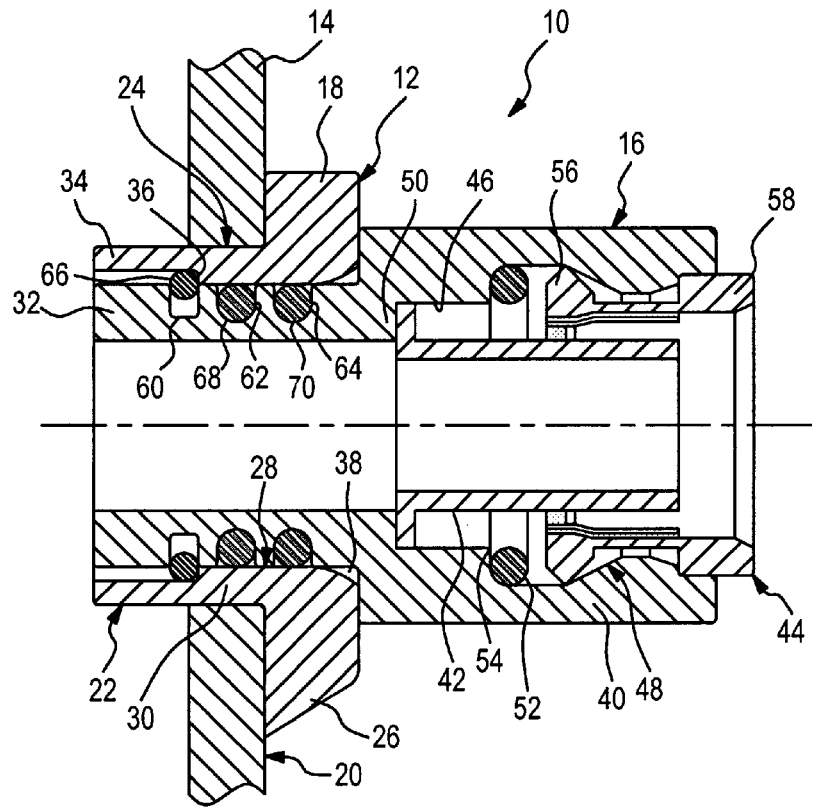
FIG. 1 is a cross-sectional view of a plug-in coupling according to a first embodiment of this invention.

Referring to FIG. 1, the reference numeral 10 generally designates a plug-in coupling according to this invention, including a ferrule 12 welded to a pressure vessel wall 14, and a plug-in fitting 16 sealingly fastened to ferrule 12.

The ferrule 12 includes a broad head 18 seated on the outer periphery 20 of the pressure vessel wall 14, and a neck 22 extending through a pressure vessel opening 24. Once in place, the head 18 is welded to the pressure vessel wall 14 at its outer radial periphery, as represented by the reference numeral 26. This provides a permanent and leak-proof seal between the ferrule 12 and the pressure vessel 14. Further, the head 18 is dimensioned to provide a significant thermal mass so that heat developed during the welding operation tends to be localized in the head 18, minimizing heat-related distortion of the neck 22. A central bore 28 extends through the head and neck portions 18, 22 of ferrule 12. The bore 28 has a dual-inside diameter defined by an outboard (with respect to pressure vessel 14) portion 30 and an inboard portions 34. The outboard portion 30 has an inside diameter designed to receive a plug portion 32 of fitting 16, and the inboard portion 34 has an inside diameter that is larger than that of the outboard portion 30, defining a radially extending shoulder 36 at the junction of the inboard and outboard portions 30, 34. Additionally, the opening of the outboard portion 30 is chamfered as indicated by the reference numeral 38.

The fitting 16 includes a plug portion 32 which is received in the central bore 28 of ferrule 12, and a coupling portion 40 adapted for leak-proof coupling to a pressure pipe (not shown). The coupling portion 40 is illustrated as a conventional push-to-connect coupling, including a support tube 42 and collet 44 retained in a central bore 46 of fitting 16 by the contoured inner surface 48 of bore 46. The support tube 42 is seated on an inboard shoulder 50 of bore 46, and an O-ring 52 is seated on an outboard shoulder 54 of bore 46. As will be well understood by those skilled in the art, the collet 44 includes a plurality of spring fingers 56 extending from an outer ring 58, the fingers 56 radially expanding when a pressure pipe is inserted over the support tube 42, thereby retaining the pressure pipe within the fitting 16 until the gripping action of the fingers 56 is released by depression of the outer ring 58. While so retained, the O-ring 52 sealingly engages both the bore 46 and the outer periphery of the pressure pipe, providing a reliable and leak-proof seal therebetween.

The coupling portion 40 of fitting 16 has an outside diameter larger than the inside diameter of the outboard portion 30 of ferrule neck 22, so that the coupling portion 40 seats on the outboard end of ferrule head 18 when the fitting 16 is fully inserted into ferrule 12, as shown. The plug portion 32, on the other hand, has an outside diameter slightly smaller than the inside diameter of the outboard portion 30 of ferrule neck 22, allowing the plug portion 32 to be smoothly inserted into the ferrule bore 28. The plug portion 32 has three annular grooves 60, 62, 64 formed therein: an inboard groove 60 for retaining a C-shaped snap ring 66, and two outboard grooves 62, 64 for retaining the O-rings 68, 70. The snap ring 66 may be formed of round (in cross-section) wire as shown, or may be formed of flat wire.

As the plug portion 32 of fitting 16 is inserted into the ferrule bore 28, the snap ring 66 contacts the chamfered surface 38, and radially collapses in the groove 60. The O-rings 68, 70 similarly collapse in the grooves 62, 64, allowing the plug portion 32 to be fully inserted. When the snap ring 66 reaches the inboard edge of shoulder 36, it radially expands against the inboard portion 34 of ferrule neck 22, so that the shoulder 36 retains the fitting 16 within the ferrule 12. At such point, the O-rings 68, 70 sealingly engage the grooves 62, 64 and the outboard portion 30 of the ferrule bore 28. The inboard O-ring 68 serves primarily to seal the pressure vessel 14 from the atmosphere, while the outboard O-ring 70 serves primarily to prevent foreign matter from reaching the O-ring 68. Additionally, the inboard groove 60 of plug portion 32 is located such that when the snap ring 66 radially expands to contact inboard portion 34 of the ferrule neck 22, the coupling portion 40 engages the outboard surface of ferrule head 18, as shown; this further inhibits entry of foreign matter into the central bore 28.

Figure 2:
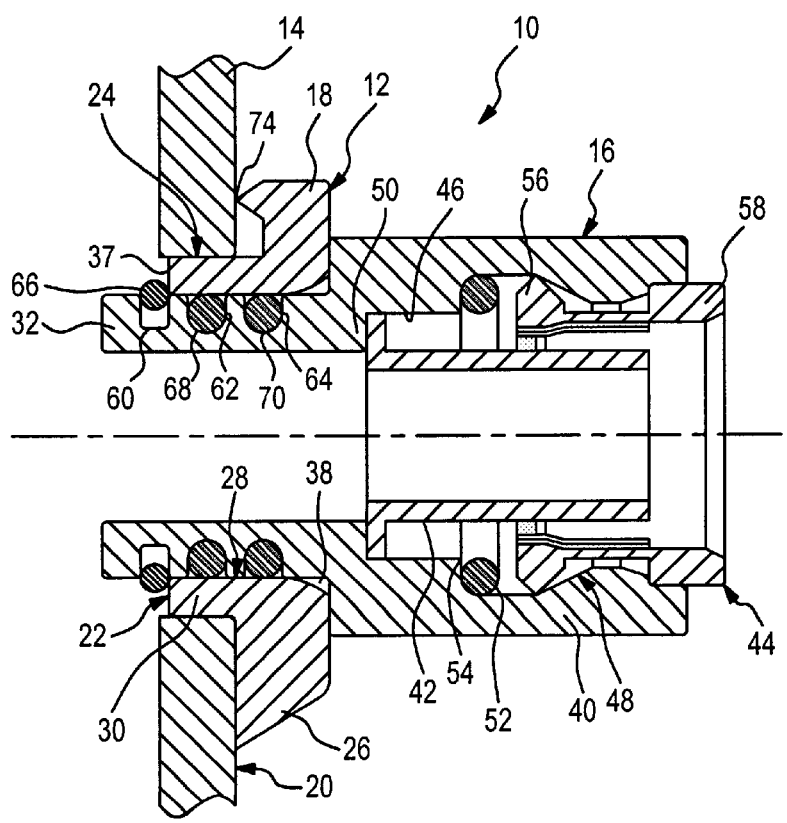
FIG. 2 is a cross-sectional view of a plug-in coupling according to a second embodiment of this invention.

FIG. 2 depicts a second embodiment of this invention, which differs from the first embodiment in two respects. Firstly, and most importantly, the central bore 28 of ferrule 12 has a constant inside diameter sized to sealingly receive the plug portion 32 of fitting 16, and the snap ring 66 seats against an inboard axial face 37 of the ferrule neck portion 22. This may be easily achieved with little or no modification to the fitting 16 by simply reducing the length of the ferrule neck portion 22 as shown in FIG. 2. As in the embodiment of FIG. 1, the snap ring 66 contacts the chamfered surface 38 during insertion of the fitting 16 and radially collapses in the groove 60. When the snap ring 66 reaches the inboard axial face 37 of the ferrule neck portion 22, it radially expands as shown in FIG. 2 to retain fitting 16 within ferrule 12. Secondly, the ferrule head portion 18 in the second embodiment is provided with an integral projection welding ring 74, the tip of which contacts the outer periphery 20 of pressure vessel wall 14 when the ferrule neck portion 22 is inserted into the pressure vessel opening 24. With this ferrule design, which is otherwise applicable to either embodiment, the ferrule 12 is electrically welded to the wall 14 utilizing low voltage and high current.

In the manner described above, the plug-in coupling of this invention provides a rugged, reliable, cost effective and leak-proof seal between a pressure pipe and a pressure vessel 14. The ferrule 12, in addition to be weldable, is very simple and inexpensive to manufacture; unlike conventional ferrules, it may be cold formed with little or no machining required, depending on the material selection. The thermal mass of the ferrule head 18 enables the ferrule 12 to be welded to the pressure vessel 14 without distorting the inner diametrical surface of the central bore 28, which serves as the sealing surface for the O-rings 68, 70. The fitting 16 is no more expensive to manufacture than any other plug-in fitting, and the double O-ring design serves to preserve the integrity of the seal, even when used in a harsh and dirty environment. The ferrule 12 may be formed of various materials, including aluminum, steel, stainless steel, brass, plastic, etc. Additionally, various welding techniques, such as MIG, TIG, oxygen-acetylene braze, induction welding, solder, electron beam welding and stick welding, may be utilized.

While described in reference to the illustrated embodiments, it will be understood that various modifications will occur to those skilled in the art. For example, a different push-to-connect fitting, a compression fitting, or even a threaded or soldered fitting, may be used in place of the conventional push-to-connect fitting 42, 44, 52, 56, 58 shown in FIG. 1. Accordingly, it will be understood that plug-in couplings incorporating these and other modifications may fall within the scope of the present invention, which is defined by the appended claims.

What is claimed is:

1. A push-to-connect coupling for leak-proof attachment of a pressure pipe to a pressure vessel, including a ferrule having a neck portion secured in an opening in the pressure vessel, a push-to-connect fitting attached to the pressure pipe and having a plug portion inserted into a central bore of the ferrule, an O-ring sealingly engaging the plug portion of the fitting and the central bore of the ferrule, and a snap ring for retaining the plug portion of the fitting in the central bore of the ferrule, the improvement wherein:

the ferrule includes a broad cylindrical head that engages an outer periphery of the pressure vessel around said opening, and is welded to the pressure vessel at an outer radial periphery of said head, said head having a thermal mass that minimizes heat-related distortion of said central bore due to the welding; and the central bore of said ferrule includes an outboard portion having an inside diameter sized to sealingly receive the plug portion of said fitting and said O-ring, and an inboard portion having an inside diameter which is larger than the inside diameter of said outboard portion, and said snap ring is seated on a shoulder defined by a junction between said inboard and outboard portions to retain said fitting within said ferrule.

2. A push-to-connect coupling for leak-proof attachment of a pressure pipe to a pressure vessel, including a ferrule having a neck portion secured in an opening in the pressure vessel, a push-to-connect fitting attached to the pressure pipe and having a plug portion inserted into a central bore of the ferrule, an O-ring sealingly engaging the plug portion of the fitting and the central bore of the ferrule, and a snap ring for retaining the plug portion of the fitting in the central bore of the ferrule, the improvement wherein:

the ferrule includes a broad cylindrical head that engages an outer periphery of the pressure vessel around said opening, and is welded to the pressure vessel at an outer radial periphery of said head, said head having a thermal mass that minimizes heat-related distortion of said central bore due to the welding; and said snap ring is seated on an inboard axial face of the neck portion of said ferrule.

3. A push-to-connect coupling for leak-proof attachment of a pressure pipe to a pressure vessel, including a ferrule having a neck portion secured in an opening in the pressure vessel, a push-to-connect fitting attached to the pressure pipe and having a plug portion inserted into a central bore of the ferrule, an O-ring sealingly engaging the plug portion of the fitting and the central bore of the ferrule, and a snap ring for retaining the plug portion of the fitting in the central bore of the ferrule, the improvement wherein:

the ferrule includes a broad cylindrical head that engages an outer periphery of the pressure vessel around said opening, and is welded to the pressure vessel at an outer radial periphery of said head, said head having a thermal mass that minimizes heat-related distortion of said central bore due to the welding;

the central bore of the ferrule includes an outboard portion having an inside diameter sized to sealingly receive the plug portion of said fitting and said O-ring, and means for forming a seat for said snap ring to retain said fitting within said ferrule; and first and second O-rings sealingly engaging the plug portion of the fitting and the central bore of the ferrule, said O-rings being disposed outboard of said snap ring.

* * * * *